(12) United States Patent
Kim

(10) Patent No.: US 12,191,437 B2
(45) Date of Patent: Jan. 7, 2025

(54) APPARATUS FOR PRESSING BATTERY CELL

(71) Applicant: LG CHEM, LTD., Seoul (KR)

(72) Inventor: Yeeun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 787 days.

(21) Appl. No.: 17/283,712

(22) PCT Filed: Jul. 9, 2020

(86) PCT No.: PCT/KR2020/009036
§ 371 (c)(1),
(2) Date: Apr. 8, 2021

(87) PCT Pub. No.: WO2021/091045
PCT Pub. Date: May 14, 2021

(65) Prior Publication Data
US 2022/0021017 A1 Jan. 20, 2022

(30) Foreign Application Priority Data
Nov. 5, 2019 (KR) .................. 10-2019-0140360

(51) Int. Cl.
*B30B 1/00* (2006.01)
*H01M 10/04* (2006.01)
*H01M 10/052* (2010.01)

(52) U.S. Cl.
CPC ......... *H01M 10/0481* (2013.01); *B30B 1/005* (2013.01); *H01M 10/052* (2013.01)

(58) Field of Classification Search
CPC . B30B 1/005; H01M 10/0481; H01M 10/052; H01M 10/0463; H01M 10/0468; H01M 10/058; H01M 10/0585; H01M 2200/10; Y02E 60/10; Y02P 70/50
See application file for complete search history.

(56) References Cited

U.S. PATENT DOCUMENTS 5,800,939 A 9/1998 Mishina et al.
2008/0131759 A1 6/2008 Hosaka et al.
(Continued)

FOREIGN PATENT DOCUMENTS

CN 109671972 A 4/2019
CN 109818038 A 5/2019
(Continued)

OTHER PUBLICATIONS

Tobushi et al., "Two-way bending properties of shape memory composite with SMA and SMP", Materials 2009, vol. 2, No. 3, pp. 1180-1192.
(Continued)

*Primary Examiner* — Jimmy T Nguyen
(74) *Attorney, Agent, or Firm* — Birch, Stewart, Kolasch & Birch, LLP

(57) ABSTRACT

An apparatus for pressing a battery cell includes a first pressing plate and a second pressing plate spaced from the first pressing plate to receive a battery cell therebetween and to press the battery cell. At least one of the first pressing plate or the second pressing plate is formed of a shape memory material to provide a pressing member.

13 Claims, 2 Drawing Sheets

(56) References Cited

U.S. PATENT DOCUMENTS

| | | | |
|---|---|---|---|
| 2010/0216048 A1* | 8/2010 | Braeuninger | H01M 8/0276 429/483 |
| 2013/0004857 A1 | 1/2013 | Kia et al. | |
| 2015/0010843 A1* | 1/2015 | Song | H01M 8/04119 429/480 |
| 2019/0157709 A1 | 5/2019 | Umemura | |
| 2019/0363392 A1 | 11/2019 | Kim et al. | |
| 2020/0328486 A1 | 10/2020 | Kwon et al. | |

FOREIGN PATENT DOCUMENTS

| | | | | | |
|---|---|---|---|---|---|
| JP | 6-231794 | A | | 8/1994 | |
| JP | 8-64234 | A | | 3/1996 | |
| JP | 2007-115604 | A | | 5/2007 | |
| JP | 2009-252897 | A | | 10/2009 | |
| JP | 2010-92662 | A | | 4/2010 | |
| JP | 2013-4294 | A | | 1/2013 | |
| JP | 2017-10933 | A | | 1/2017 | |
| JP | 2018-163794 | A | | 10/2018 | |
| KR | 20-1998-019881 | U | | 7/1998 | |
| KR | 10-2006-0111846 | A | | 10/2006 | |
| KR | 10-2007-0036482 | A | | 4/2007 | |
| KR | 10-2008-0039091 | A | | 5/2008 | |
| KR | 10-2008-0049648 | A | | 6/2008 | |
| KR | 20140147412 | A | * | 12/2014 | H01M 50/116 |
| KR | 10-2015-0037309 | A | | 4/2015 | |
| KR | 10-2018-0131004 | A | | 12/2018 | |
| KR | 10-2019-0031831 | A | | 3/2019 | |
| KR | 10-2019-0084775 | A | | 7/2019 | |
| WO | WO-2018221129 | A1 | * | 12/2018 | H01M 10/0404 |
| WO | WO 2019/139316 | A1 | | 7/2019 | |

OTHER PUBLICATIONS

Extended European Search Report for European Application No. 20866927.5, dated Dec. 3, 2021.

* cited by examiner

[FIG. 1]
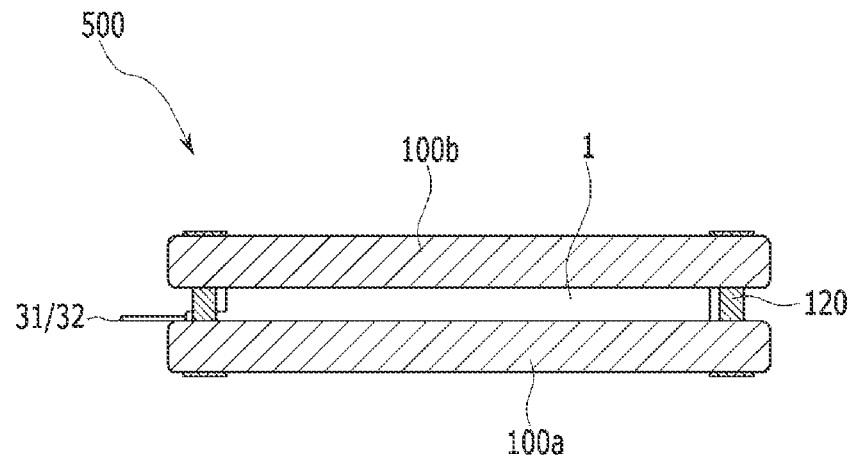
[FIG. 2]
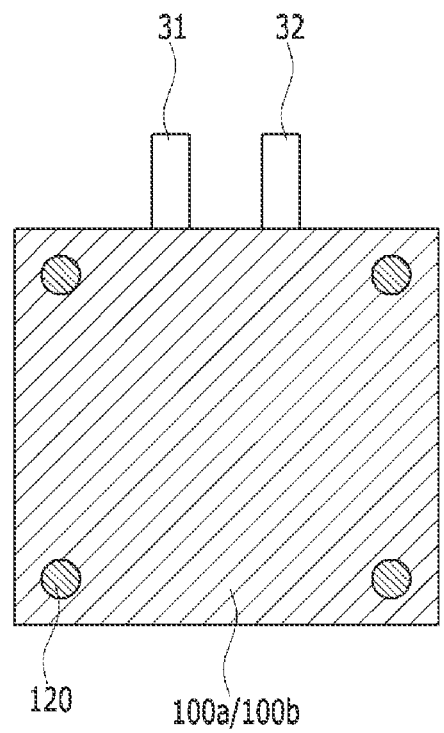

[FIG. 3]
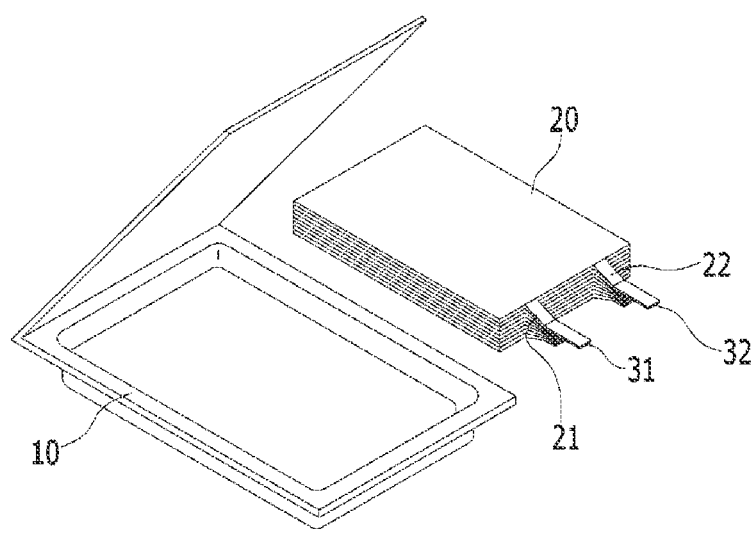
[FIG. 4]
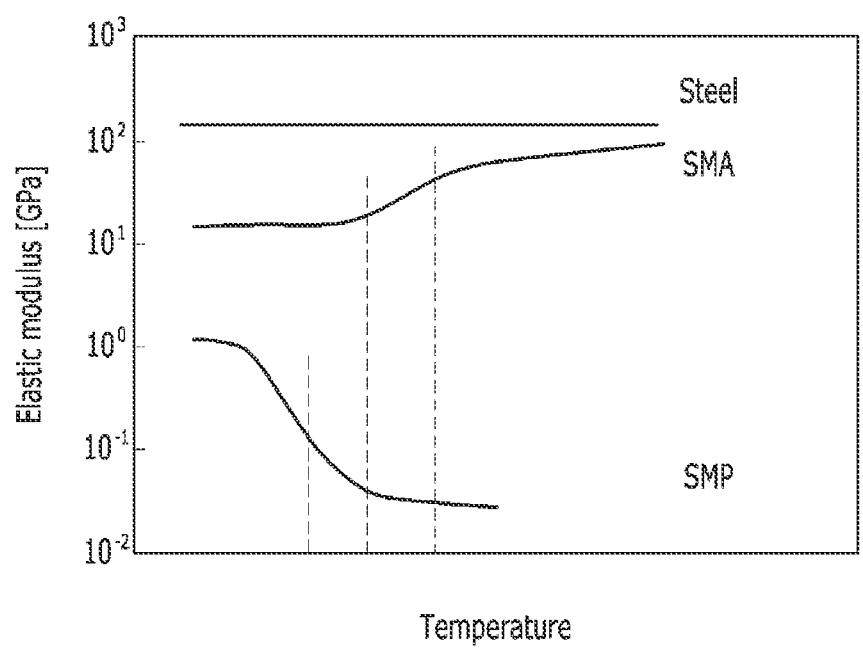

APPARATUS FOR PRESSING BATTERY CELL

TECHNICAL FIELD

Cross Citation with Related Application(s)

This application claims the benefit of Korean Patent Application No. 10-2019-0140360 filed on Nov. 5, 2019 with the Korean Intellectual Property Office, the disclosure of which is incorporated herein by reference in its entirety.

The present disclosure relates to an apparatus for pressing a battery cell, and more particularly to an apparatus for pressing a battery cell using a shape memory material.

Background Art

Secondary batteries, which are easily applied to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an exterior material, that is a battery case, which seals and receives the electrode assembly together with an electrolyte solution.

The lithium secondary battery includes a positive electrode, a negative electrode, and a separator and an electrolyte interposed therebetween. Depending on which material is used for the positive electrode active material and the negative electrode active material, the lithium secondary battery is classified into a lithium ion battery and a polymer lithium ion battery. Generally, an electrode of the lithium secondary battery is prepared by applying the positive or negative electrode active material to a current collector made of aluminum or copper sheet, mesh, film, foil, or the like and then drying the same.

Meanwhile, it is necessary to attach a positive electrode plate, a negative electrode plate, and a separator to each other uniformly as a whole such that the reaction can occur uniformly in all parts of secondary battery. Therefore, there is a need to develop of an apparatus for pressing a secondary battery in a balanced manner.

DETAILED DESCRIPTION OF THE INVENTION

Technical Problem

It is an object of the present disclosure to provide an apparatus for pressing a battery cell, which realizes constant pressure.

However, the problem to be solved by embodiments of the present disclosure is not limited to the above-described problems, and can be variously expanded within the scope of the technical idea included in the present disclosure.

Technical Solution

An apparatus for pressing a battery cell according to an embodiment of the present disclosure includes a first pressing plate and a second pressing plate spaced from the first pressing plate to receive a battery cell therebetween and to press the battery cell, wherein at least one of the first pressing plate or the second pressing plate is formed of a shape memory material to provide a pressing member.

The pressing member is configured to store a shape in accordance with the battery cell at a temperature at which the battery cell is driven and deformation of the pressing member due to a volume expansion of the battery cell acts as a force for returning the shape of the pressing member to an original shape of the pressing member after the driving of the battery cell, thereby pressing the battery cell.

An interval between the first pressing plate and the second pressing plate may be increased by a volume expansion of the battery cell.

An upper surface of the first pressing plate and a lower surface of the second pressing plate are pressed by the expansion of the battery cell in a thickness direction of the battery cell so that the shapes of the first pressing plate and the second pressing plate may be changed.

When the volume of the battery cell is reduced, the interval between the first pressing plate and the second pressing plate may be reduced.

The shape memory material may include a shape memory polymer.

The battery cell may be configured such that an electrode assembly of a structure having a positive electrode, a negative electrode, and a separator interposed between the positive electrode and the negative electrode is sealed together with an electrolyte in the interior of a battery case.

The first pressing plate may be arranged to make contact with a lower surface of the battery case, the second pressing plate may be arranged to make contact with an upper surface of the battery case, and a side surface of the battery case, which is located between the first pressing plate and the second pressing plate, may be exposed to the outside.

The first pressing plate and the second pressing plate may be coupled to each other by coupling fins.

The coupling fins may be springs.

The coupling fins may be formed of the shape memory material.

The coupling fins may be formed of a shape memory polymer.

An interval between the first pressing plate and the second pressing plate may be identical to or larger than the thickness of the battery cell.

The battery cell may be a lithium metal cell.

When viewed from above, the first pressing plate and the second pressing plate have areas that may be larger than the area of the battery cell.

Advantageous Effects

According to the embodiments, by using the apparatus for pressing a battery cell, which uses the shape memory material in the lithium metal cell, the restoring force due to the volume change of the battery cell can be generated, thereby realizing a constant pressure jig effect. Accordingly, a high force, which is necessary for the lithium metal cell, may be provided by an excellent shape restoring force with a light weight.

BRIEF DESCRIPTION OF THE DRAWINGS

FIG. 1 is a side view illustrating a state in which a secondary battery cell is disposed in an apparatus for pressing a battery cell according to an embodiment of the present disclosure;

FIG. 2 is a front view of the apparatus for pressing a battery cell of FIG. 1;

FIG. 3 is a perspective view illustrating a structure of a lithium secondary battery; and FIG. 4 is a graph depicting elastic moduli according to temperature.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, the size and thickness of each element shown in the figures are arbitrarily illustrated for convenience of description, and the present disclosure is not necessarily limited to those illustrated in the drawings. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

FIG. 1 is a side view illustrating a state in which a secondary battery cell is disposed in an apparatus for pressing a battery cell according to an embodiment of the present disclosure. FIG. 2 is a front view of the battery cell pressing device of FIG. 1. FIG. 3 is a perspective view illustrating a structure of a lithium secondary battery. FIG. 4 is a graph depicting elastic moduli according to temperature.

Referring to FIGS. 1 and 2, the apparatus for pressing a battery cell 500 according to the present embodiment includes a pair of pressing plates 100a and 100b coupled to each other by a plurality of coupling fins 120, and a battery cell 1 located between the pair of pressing plates 100a and 100b. The coupling fin 120 according to the present embodiment may be formed of springs.

A plurality of coupling fins 120 may be disposed at four corners on planes of pressing plates 100a and 100b. The first pressing plate 100a and the second pressing plate 100b may be disposed to be spaced apart from each other due to a coupling form of the coupling fins 120. A space, in which the battery cell 1 may be disposed, is formed between the first pressing plate 100a and the second pressing plate 100b, which are spaced apart from each other. The inner width of the space, in which the battery cell 1 is disposed, that is an interval between the pressing plates 100a and 100b, may be identical to or slightly larger than the thickness of the battery cell 1.

Electrode leads 31 and 32 are protruded in one direction of the battery cell 1 according to the present embodiment, and the electrode leads 31 and 32 may be protruded between the two coupling fins 120 located on sides of the pressing plates 100a and 100b.

At least one of the pressing plates 100a and 100b according to the present embodiment is a pressing member formed of a shape memory material. A shape memory material is a material having a shape memory effect that stores the shape stored at a specific temperature, transforms it into a completely different shape as a force is applied, and returns to its original shape when being heated.

The pressing member formed of the shape memory material according to the present embodiment stores a shape in accordance with the battery cell 1 at a temperature at which the battery cell 1 is driven, and then, deformation of the pressing member due to a volume expansion of the battery cell acts as a force for returning the shape of the pressing member to the original shape of the pressing member after the driving of the battery cell 1 such that the battery cell 1 is pressed by the pressing member. In other words, when the battery cell 1 is swelled, the battery cell 1 pushes out the pressing member formed of the shape memory material, and the battery cell 1 is pressed by the force that tends to always return the shape of the pressing member to the original shape of the pressing member due to the characteristics of a memory material. In detail, if the battery cell 1 illustrated in FIGS. 1 and 2 expands in a thickness direction of the battery cell 1, an upper surface of the first pressing plate 100a and a lower surface of the second pressing plate 100b are pressed, and accordingly, the shapes of the first and second pressing plates 100a and 100b are changed. That is, the interval between the first pressing plate 100a and the second pressing plate 100b is increased by the volume expansion of the battery cell 1. Thereafter, if heat is applied to the apparatus for pressing a battery cell 500, a restoring force that tends to return the first and second pressing plates 100a and 100b to the original shape thereof is generated so that the restoring force can be applied to the battery cell 1 to restrain the volume expansion of the battery cell 1. If the expanded volume of the battery cell 1 may be decreased by a discharge of the battery cell 1, the interval between the first pressing plate 100a and the second pressing plate 100b may be reduced.

In particular, a dendrite phenomenon of causing an explosion or shortening lifetime in a lithium metal battery may occur. The dendrite phenomenon refers to production of crystal of a branch shape, which is formed on a surface of a lithium metal. That is, the apparatus for pressing a battery cell according to the present embodiment may be applied to implement the required pressurization when the lithium dendrite phenomenon occurs in the lithium metal battery.

The battery cell 1, to which the apparatus for pressing a battery cell according to the present embodiment is applied, corresponds to a lithium metal cell, the lithium metal cell has a large volume expansion during charging and discharging. When the lithium metal cell is pressed, lifetime performance during cycles of charging and discharging is superior to that when it is not pressed. Therefore, in the case of a lithium metal cell, a pressurizing device is absolutely necessary.

When the lithium metal cell is driven, a high pressure of a maximum of 4 MPa is required, and a thick and heavy apparatus for pressing a battery cell made of a metal material having a high strength may be used, but because the pressing apparatus is bulky and heavy, it may be disadvantageous in terms of large energy density, which is the greatest benefit when the lithium metal is applied to a negative electrode. Accordingly, when the pressing member formed of the shape memory material is used according to the present embodiment, a pressing apparatus, which is small and light while applying a high force, may be implemented. When a spring jig that applies a specific pressure is used, the lifetime performance of the pressing apparatus may be improved as compared with when a static jig having fixed thickness is used in the apparatus for pressing a battery cell is used. According to the present embodiment, a constant pressure jig, such as a spring jig, may be implemented as the pressing member formed of the shape memory material is used.

The shape memory effect is realized by the pressing member of the shape memory material according to the present embodiment, and the restoring force due to a volume change of the battery cell 1 is generated to operate as the constant pressure jig effect.

As illustrated in FIG. 3, the battery cell according to the present embodiment is configured so that an electrode assembly 20 formed of a positive electrode, a negative electrode, and a separator interposed therebetween is embedded in the interior of the battery case 10. Electrode tabs 21 and 22 protruding from the positive electrode and the negative electrode of the electrode assembly 20 may be installed to be electrically connected to the electrode leads 31 and 32 of the positive electrode and the negative electrode, respectively, to be exposed to the outside.

According to the present embodiment, the first pressing plate 100a may make contact with a lower surface of the battery case 10, the second pressing plate 100b may make contact with the an upper surface of the battery case 10, and side surfaces of the battery case 10, which is located between the first pressing plate 100a and the second pressing plate 100b, may be exposed to the outside. Here, the side surfaces of the battery case 10 has four surfaces, and it is preferable that all of the four surfaces are exposed to the outside. The reason for this structure will be explained while a case in which the battery case itself surrounding the battery cell is formed of a shape memory alloy is taken as a comparative example.

The volume change of the lithium metal cell, to which the embodiment of the present disclosure is applied, is very large when being charged and discharged once unlike a cell included in a lithium ions battery, and the thickness of the battery cell continuously increases as the cycle is repeated because lithium dendrite is continuously formed. When the plates for pressing fixes even the side surfaces of the battery case 10 in a state of charge 0% (SOC0) state, the thickness difference is very large so that a pressure may not be applied in a SOC0 state if the apparatus for pressing is made to have the thickness corresponding to a state of charge 100% (SOC100) of the battery cell. Further, when the end of life (EOL) is reached through repeated charging and discharging, the thickness of the battery cells may significantly increase as compared with the initial SOC100, thereby resulting in a larger pressure than the initial SOC100. Accordingly, in the comparative example in which the shape memory alloy is used as the battery case itself, all of the side surfaces thereof are fixed so that it is difficult to apply a specific pressure to the battery cell. In addition, when the battery cell is pressed by using the battery case corresponding to the comparative example, it is difficult to uniformly transfer a force to the area of the electrode. This is because, in the case of a battery case such as a can type, a surface of the battery case, which expands during a volume expansion of a battery cell is curved and thus it is difficult to uniformly press the electrode.

The shape memory material according to the present embodiment may be a shape memory polymer. The shape memory polymer may be highly elastically deformed as compared with the shape memory alloy, and has advantages of low costs, a low density, an excellent shape restoring force, and a high tensile strength.

According to the present embodiment, because the shape memory polymer is used in the pressing plates included in the apparatus for pressing, a high force of approximately 400% or more of a restoring force, which is necessary when the pressing plates are applied to a lithium metal cell, that is, a restoring stress, can be provided.

In addition, referring to FIG. 4 that is a graph relating to the elastic moduli according to temperature, steel refers to a steel metal, SMA refers to a shape memory alloy, and SMP refers to a shape memory polymer. The value of elastic modulus of SMP is lower than the value of elastic modulus of SMA in a specified temperature section. This indicates that SMP can be prolonged better than SMA. As the battery cell 1 illustrated in FIGS. 1 and 2 expands and the thickness of the battery cell 1 increases, an interval between the pressing plates 100a and 100b of the apparatus for pressing a battery cell 100 should increase so that a pressure applied to the battery cell 1 is uniform. Here, because SMP is prolonged better as compared with SMA, the pressure applied to the battery cell 1 is lower in SMP than in SMA. Accordingly, SMP is more suitable for the constant pressure jig type of the lithium metal battery, than SMA. The origin of the graph in FIG. 4 are as follows: Tobushi, Hisaaki, Shunichi Hayashi, and Yoshiki Sugimoto. "Two-way bending properties of shape memory composite with SMA and SMP." Materials 2.3 (2009): 1180-1192.

While the battery cell 1 is disposed in the interior of the apparatus for pressing a battery cell, and the first and second pressing plates 100a and 100b are coupled to each other by the coupling fins 120, the battery cell expands and the thickness thereof increases if an activation and aging process is performed on the battery cell 1. Herein, an activation and aging process before release of a product has been mentioned, but it is not limited to a process step, and the apparatus for pressing a battery cell according to the embodiment of the present disclosure may be applied to a battery cell driving step.

The pair of the pressing plates 100a and 100b are formed of the shape memory material and are coupled to each other by the coupling fins 120, and thus they are light-weighted and are easy to handle. In the above-configured apparatus for pressing a battery cell according to an embodiment of the present disclosure, the pressing plates 100a and 100b are formed of the shape memory material and thus they can be light-weighted and are light in weight and may be suitable for use for a battery, in which energy density per weight is important like drones.

In the above-mentioned embodiment, it has been explained that the coupling fins 120 are formed of the springs, but the coupling fins 120 may be formed of the shape memory material as a modified embodiment. In this connection, if the interval between the first pressing plate 100a and the second pressing plate 100b are increased by the volume expansion of the battery cell 1, the length of the coupling fins 120 may be also increase. Because the coupling fins 120 themselves are formed of the shape memory material, the restoring force is generated, and thus the volume expansion of the battery cell 1 can be further restrained due to the restoring force. The coupling fins 120 may be also formed of the shape memory polymer. The coupling fins 120 may be also formed of the shape memory polymer.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

1: battery cell
10: battery case
20: electrode assembly
100a, 100b: pressing plate

The invention claimed is:

1. An apparatus for pressing a battery cell, the apparatus comprising:
a first pressing plate; and
a second pressing plate spaced from the first pressing plate to receive a battery cell therebetween and to press the battery cell,
wherein at least one of the first pressing plate or the second pressing plate is formed of a shape memory material to provide a pressing member,
wherein the shape memory material comprises a shape memory polymer,
wherein the pressing member is configured to store a shape in accordance with the battery cell at a temperature at which the battery cell is driven, and
wherein deformation of the pressing member due to a volume expansion of the battery cell acts as a force for returning the shape of the pressing member to an original shape of the pressing member after the battery cell is driven, thereby pressing the battery cell.

2. The apparatus of claim 1, wherein an interval between the first pressing plate and the second pressing plate is increased by a volume expansion of the battery cell.

3. The apparatus of claim 2, wherein an upper surface of the first pressing plate and a lower surface of the second pressing plate are pressed by the expansion of the battery cell in a thickness direction of the battery cell so that the shapes of the first pressing plate and the second pressing plate are changed.

4. The apparatus of claim 2, wherein, when the volume of the battery cell is reduced, the interval between the first pressing plate and the second pressing plate is reduced.

5. The apparatus of claim 1, wherein the battery cell is configured such that an electrode assembly of a structure having a positive electrode, a negative electrode, and a separator interposed between the positive electrode and the negative electrode is sealed together with an electrolyte in the interior of a battery case.

6. The apparatus of claim 5, wherein the first pressing plate is arranged to make contact with a lower surface of the battery case, the second pressing plate is arranged to make contact with an upper surface of the battery case, and a side surface of the battery case, which is located between the first pressing plate and the second pressing plate, is exposed to the outside.

7. The apparatus of claim 1, wherein the first pressing plate and the second pressing plate are coupled to each other by coupling fins.

8. The apparatus of claim 7, wherein the coupling fins are formed of the shape memory material.

9. The apparatus of claim 7, wherein the coupling fins are formed of a shape memory polymer.

10. The apparatus of claim 1, wherein an interval between the first pressing plate and the second pressing plate is identical to or larger than the thickness of the battery cell.

11. The apparatus of claim 1, wherein the battery cell is a lithium metal cell.

12. The apparatus of claim 1, wherein, when viewed from above, the first pressing plate and the second pressing plate have areas that are larger than an area of the battery cell.

13. An apparatus for pressing a battery cell, the apparatus comprising:
a first pressing plate;
a second pressing plate spaced from the first pressing plate to receive a battery cell therebetween and to press the battery cell; and
a plurality of coupling fins coupling the first pressing plate and the second pressing plates,
wherein at least one of the first pressing plate or the second pressing plate is formed of a shape memory material to provide a pressing member, and
wherein the coupling fins are springs.

* * * * *